May 4, 1948.  J. L. DEFANDORF ET AL  2,440,849

CONTROLLER AFFORDING AUTOMATIC STOPPING OF MOTOR DRIVEN MACHINERY

Filed March 26, 1945

Inventors
John L. Defandorf
Victor S. Dywulka
By
Attorney

Patented May 4, 1948

2,440,849

UNITED STATES PATENT OFFICE 2,440,849

CONTROLLER AFFORDING AUTOMATIC STOPPING OF MOTOR-DRIVEN MACHINERY

John L. Defandorf, Whitefish Bay, and Victor S. Sywulka, Wauwatosa, Wis., assignors to Cutler-Hammer, Inc., Milwaukee, Wis., a corporation of Delaware Application March 26, 1945, Serial No. 584,820

11 Claims. (Cl. 318—467)

This invention relates to controllers for motor driven machinery and while not limited thereto is especially advantageous for tire building machines.

In a tire building machine comprising a drum on which the carcass of the tire is built up of a number of separate strips it is important to be able to stop the drum in any of a number of predetermined rotary positions following a single revolution, a number of revolutions, or a fractional revolution. Accordingly control for such a drum has presented a real problem in respect of limit mechanism capable of performing with reasonable accuracy and with endurance the unusually numerous stopping operations required of it.

The present invention has among its objects to provide a controller solving such problem, and more specifically to provide a control with relatively simple, effective and reliable limit means which is practically free of mechanical wear.

Other objects and advantages of the invention will hereinafter appear.

An embodiment of the invention is schematically and diagrammatically illustrated in the accompanying drawing which will now be described, it being understood that the embodiment illustrated is susceptible of various modifications without departing from the scope of the appended claims.

Figure 1:
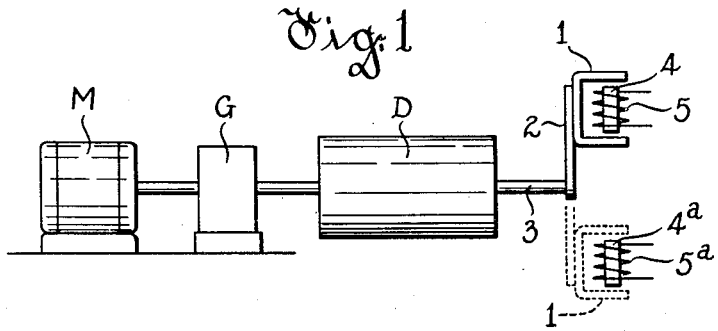
Figure 1 shows schematically the machine to be controlled.

Referring to Fig. 1, the same shows schematically a rotating drum D for any desired purpose, as for receiving strips of material to be used in producing a tire, a motor M for driving said drum and suitable reduction gearing G interposed between the motor and the drum. Also this figure shows part of the limit means for the motor operated drum, such means comprising a U-shaped part 1 of magnetic material carried by an arm 2 on the shaft 3 of the drum, said part 1 in certain rotary positions of the drum straddling one or another of relatively stationary magnetic cores 4, 4a, said cores being provided with coils 5, 5a, respectively. The cores 4, 4a with their coils constitute in combination with the magnetic member 1 variable reactors to be employed in control of motor M, as hereinafter set forth. While Fig. 1 shows only two cores 4, 4a spaced approximately 180 deg. apart, it is to be understood that additional core members may be provided and spaced as desired. In practice it has been found desirable in the case of a tire building machine to provide four core members spaced 90 deg. apart.

In practice the motor M may be of any preferred type and may have any preferred type of control means to effect starting and acceleration thereof. For simplicity of illustration the motor has been depicted in Fig. 2 as of the direct current shunt type having an armature $a$ and a shunt field winding $f$. The shunt field winding $f$ is shown as permanently connected across direct current lines $L^1$, $L^2$ while the armature is shown as provided with a main switch 10 to connect the same across said lines $L^1$, $L^2$, or alternatively to establish therefor a dynamic braking circuit inclusive of a resistor $r$. Also for simplicity of illustration the armature circuit is shown without accelerating resistors, but as will be understood such resistors may be provided and controlled in any of the well known ways. The main switch 10 has normally disengaged contacts 11 engageable upon energization of said switch to establish line connections for the motor armature, and normally engaged contacts 12 to complete the dynamic braking loop including resistor $r$.

Figure 2:
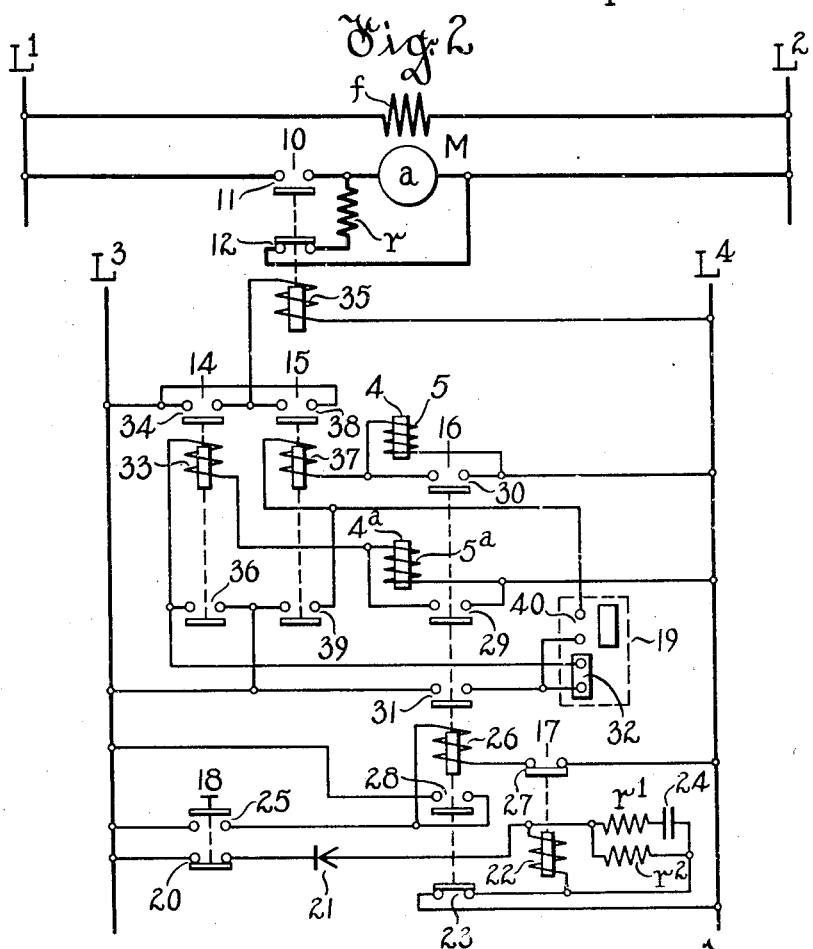
Fig. 2 shows diagrammatically the driving motor and its control means.

The winding of main switch 10 and the other control elements shown in Fig. 2 are arranged for supply of power from alternating current lines $L^3$, $L^4$. The additional control means comprises electroresponsive relays 14 and 15 which control main switch 10 and which in turn are under the influence of the reactors comprising cores 4, 4a. Further the additional control means comprises an electroresponsive relay 16 affording control both of the aforementioned relays and of the aforementioned reactors; a time element relay 17 affording control of relay 16 and a push button switch 18 affording control by foot or hand of both relays 16 and 17. Additionally the control means includes a selector switch 19 shown as of the drum type, such switch affording the selection hereinafter set forth and representing only part of a commonly employed program mechanism which has been omitted for simplicity of illustration.

As will later be described in greater detail, the control means illustrated provide for energization of relay 16 upon operation of the push button switch, said relay in turn effecting response of relays 14–15 according to the setting of selector switch 19, to energize the main switch of motor M for operation of the drum D. The relay 16 in so functioning short-circuits the coils 5, 5a of the two reactor cores 4, 4ª and the relay 14 or 15 energized by response of relay 16 establishes for itself a maintaining circuit independent of relay 16 which after the lapse of a temporary period is released by the timing relay 17. Such release of relay 16 interrupts the short-circuits around the coils 5, 5ª and according to the setting of the selector switch 19 one or other of said coils is included in circuit in series relation with the winding of the relay energized upon response of relay 16. The reactor means is so designed that its reactance is sufficient to effect release of the relay 14 or relay 15, as the case may be, when the magnetic member 1 straddles the core member corresponding to the energized relay, but meanwhile to have sufficient reluctance as the result of air gap between the moving magnetic member 1 and the preselected core member to reduce the reactance in the energizing circuit of the preselected relay to a value permitting the relay to hold closed. Thus in the selected angular position of the drum the reactor means through deenergization of relay 14 or 15, as the case may be, releases main switch 10 to disconnect the motor armature from circuit and to establish a dynamic braking circuit to bring the motor quickly to rest.

Here it will be noted that the reactor means obviates need of a limit switch to initiate the stopping cycle, and that the relatively movable parts of the reactance means have clearance with consequent freedom from mechanical wear, whereas as will be understood the electroresponsive means and other switches employed may be designed for very much longer life than can a limit switch. Moreover the reactor means being free of mechanical wear obviates the need of adjustment for wear encountered in the use of a limit switch in order to preserve accuracy of stops.

Considering the showing of Fig. 2 in further detail, it will be noted that the push button switch 18 has normally engaged contacts 20 which complete circuit from line L³ through a rectifier 21 to and through the winding 22 of relay 17, and thence to and through normally engaged contacts 23 of relay 16 to line L⁴. Hence relay 17 will be normally energized subject to deenergization upon operation of push button switch 18. However, relay 17 does not release immediately owing to the shunt provided for the winding 22, which shunt includes a condenser 24, a resistor $r^1$ in series with said condenser and a resistor $r^2$ paralleling resistor $r^1$ and condenser 24. This shunt connection which is well known affords the relay 17 a time element in opening, such time element representing the maximum time during which relay 16 may be maintained energized by push button switch 18. The energizing circuit of relay 16 extends from line L³ through normally disengaged contacts 25 of push button switch 18 to and through the winding 26 of said relay 16, to and through normally disengaged contacts 27 of relay 17 to line L⁴. Relay 16 has normally disengaged contacts 28 which establish for it a maintaining circuit independent of the push button switch 18, but this maintaining circuit includes the contacts 27 of relay 17, thus as aforestated limiting the period of energization of relay 16 to the time element afforded by relay 17. Also relay 16 has normally disengaged contacts 29 and 30 which as will be apparent respectively control short-circuits for the two reactor coils 5, 5ª, respectively, and said relay has other normally disengaged contacts 31 in series with the windings of both relays 14 and 15.

Assuming the selector switch 19 to be set in the position shown, relay 16 through its contacts 31 completes circuit from line L³ to and through contacts 32 of selector switch 19 to and through the winding 33 of relay 14 to line L⁴ through contacts 29 of relay 16. This provides for full energization of relay 14 since reactor coil 5ª is short-circuited and relay 14 upon responding completes circuit from line L³ through its contacts 34 to and through the winding 35 of main switch 10, causing the latter to respond to effect operation of motor M. Also relay 14 in responding engages its normally disengaged contact 36 to complete for itself a maintaining circuit shunting the selector switch 19 and the contacts 31 of relay 16. Thus relay 14 remains energized upon release of relay 16 to remove the short-circuit from the reactor coil 5ª which then is inserted in series with the winding of relay 14 to cause the latter relay to release to deenergize main switch 10 when the drum D causes the magnetic part 1 to straddle the core 4ª of coil 5ª.

The relay 15 and the reactor coil 5 are inactive with the selector set in the position illustrated, whereas with the selector shifted to bridge its contacts 40 the relay 15 and the reactor coil 5 are placed under control of relay 16 to control the motor main switch 10 in the manner just described, except that stopping is effected in a different rotary position of the drum determined by the position of the stationary reactor core 4. The relay 15 has contacts 38 paralleling contacts 34 of relay 14 and also has contacts 39 corresponding to contacts 36 of relay 14. Thus it will be seen that where additional stopping positions of the drum D are desired it is merely necessary to further duplicate relay 14 and its associated reactor part, and to add to the selector and relay 16 such additional contacts as are needed to place each added relay in the same relation to relays 14 and 15 as that existing between the latter. Likewise it will now be apparent that after the drum D is stopped in any position it may be caused to rotate a complete revolution by again operating the push button switch 18 without change of the position of the selector. When the single revolution is completed the same reactor means will effect stopping. Thus it will also be apparent that the selector may be constructed to afford any of a wide variety of programs for rotating the drum in steps of the same or different predetermined numbers of degrees of rotation, and that continuous operation of the drum for any desired length of time merely requires connecting the winding of main switch 10 by the selector or other switch to line L³ in shunt with the contacts 34 and 38 and similar additional contacts, if any.

What we claim as new and desire to secure by Letters Patent is:

1. In combination, a rotary drum, an electric motor for rotating said drum, reactor means including a part driven by said motor and moving in a fixed relation to said drum to vary the reluctance of said means for a varying reactance value attaining a maximum in a given rotary position of said drum, and control means for effecting running of said motor and including means for effecting automatic stopping of said motor initiated at and by a predetermined reactance value of said reactor means.

2. In combination, a rotary drum, an electric motor for rotating said drum, reactor means including a part driven by said motor and moving in a fixed relation to said drum to vary the reluctance of said means for a varying reactance value and to afford a reactance peak in any one of a number of predetermined rotary positions of said drum, and control means for effecting running of said motor subject to control by said reactor means for automatic stopping of said motor, said control means including means to preselect at starting for limiting rotation of said drum any one of the reactance peaks afforded by said reactor means.

3. In combination with a rotary drum, an electric motor for rotating said drum, and reactor means comprising a plurality of relatively stationary parts and a part driven by said motor and moving in a fixed relation to said drum to cooperate with said relatively stationary parts individually to vary the reluctance of said means for variation of its reactance value and thus to provide a maximum reactance value in any one of a number of different rotary positions of said drum, and control means for effecting running of said motor subject to control by said reactor means for stopping of said motor automatically, said control means including selecting means to be set at starting to effect stopping as said movable part attains a given relation to any selected one of said relatively stationary parts.

4. In combination, a rotary drum, an electric motor for rotating said drum, reactor means comprising a part of magnetic material rotatable with said drum and further comprising in cooperative relation to said moving part relatively stationary coils and magnetic cores therefor, said coils with their cores being spaced along the path of said movable part whereby a minimum reluctance and maximum reactance value of said means may be obtained in any one of a plurality of rotary positions of said drum, and control means to effect running of said motor and preselection at starting of any one of said coils with its respective core for cooperation with said rotary part, said control means comprising means rendered effective by increase to a given value of the reactance of said reactor means to stop said motor.

5. In combination, a device to be driven, an electric motor for driving the same, reactor means including a part driven by said motor and moving in a fixed relation to said device to vary the reluctance of said means for a varying reactance value and said means affording a reactance peak in any one of a number of predetermined positions of said device, and control means for effecting running of said motor subject to control by said reactor means for automatic stopping of said motor, said control means comprising means to preselect in starting said motor the reactance peak as a function of which said motor is to be stopped.

6. In combination, a device to be driven, an electric motor for driving the same, reactor means including a part driven by said motor and moving in a fixed relation to said device to vary the reluctance of said means for a varying reactance value and said means affording a reactance peak in any one of a number of predetermined positions of said device, and control means for effecting running of said motor subject to control by said reactor means for automatic stopping of said motor, said control means comprising a plurality of relays to be selectively employed to effect motor starting, and said relays being coordinated with said reactor means to be employed for stopping said motor and each so acting in response to a different reactance peak.

7. In combination, a device to be driven, an electric motor for driving the same, reactor means including a part driven by said motor and moving in a fixed relation to said device to vary the reluctance of said means for a varying reactance value and said means affording a reactance peak in any one of a number of predetermined positions of said device, and control means for effecting running of said motor subject to control by said reactor means for automatic stopping of said motor, said control means comprising a plurality of relays to be selectively employed in effecting different cycles of motor operation and stopping thereof and being coordinated with said reactor means to be respectively subjected to the influence of different reactance peaks, and said control means further comprising selecting means for said relays and means through the medium of which successive cycles of operation of said motor may be initiated at will.

8. In combination, a device to be driven, an electric motor for driving the same, reactor means including a part driven by said motor and moving in a fixed relation to said device to vary the reluctance of said means for a varying reactance value and said means affording a reactance peak in any one of a number of predetermined positions of said device, and control means for effecting running of said motor subject to control by said reactor means for automatic stopping of said motor, said control means comprising a plurality of relays to be selectively employed in effecting different cycles of motor operation and stopping thereof and being coordinated with said reactor means to be respectively subjected to the influence of different reactance peaks, and said control means further comprising selecting means for said relays and means through the medium of which successive cycles of operation of said motor may be initiated at will but only upon successive operations of the last mentioned means.

9. In combination, an electric motor, means for effecting running thereof, said means comprising a plurality of electroresponsive relays any one of which when energized effects starting of said motor and upon deenergization effects stopping of said motor, and selective control means for said relays which comprises a reactor device having parts individualized to said relays and also having a part driven by said motor, which driven part in moving to different predetermined positions raises from a relatively low value to a relatively high value the reactance of the first mentioned parts selectively for deenergizing any relay selected for starting said motor and thereby providing different limits for said motor preselectable in starting of said motor.

10. In combination, an electric motor, means for effecting running thereof, said means comprising a plurality of electroresponsive relays any one of which when energized effects starting of said motor and upon deenergization effects stopping of said motor, and selective control means for said relays which comprises a reactor device having parts individualized to said relays and also having a part driven by said motor which driven part in moving to different predetermined positions raises from a relatively low value to a relatively high value the reactance of the first mentioned parts selectively for deenergizing any relay selected for starting said motor and thereby providing different limits for said motor preselectable in starting of said motor, said selective control means further comprising means for initially energizing any of said relays while short-circuiting the respective individualized part of said reactor device and then automatically removing the short-circuit.

11. In combination, an electric motor, means for effecting running thereof, said means comprising a plurality of electroresponsive relays any one of which when energized effects starting of said motor and upon deenergization effects stopping of said motor, and selective control means for said relays which comprises a reactor device having parts individualized to said relays and also having a part driven by said motor which driven part in moving to different predetermined positions raises from a relatively low value to a relatively high value the reactance of the first mentioned parts selectively for deenergizing any relay selected for starting said motor and thereby providing different limits for said motor preselectable in starting of said motor, said selective control means further comprising means to energize at will any one of said relays and then place the energized relay under control by its respective individualized part of said reactor device free from interference by the last mentioned means.

JOHN L. DEFANDORF.
VICTOR S. SYWULKA.

REFERENCES CITED

The following references are of record in the file of this patent:

UNITED STATES PATENTS

| Number | Name | Date |
|---|---|---|
| 1,982,442 | Lubkin | Nov. 27, 1934 |
| 2,189,193 | Brown | Feb. 6, 1940 |